United States Patent [19]
Perlman et al.

[11] Patent Number: 5,450,407
[45] Date of Patent: Sep. 12, 1995

[54] ENCAPSULATION OF AN ADDRESS WITHIN A FORWARDED FRAME IN A COMPUTER COMMUNICATIONS SYSTEM

[75] Inventors: Radia J. Perlman, Acton; William R. Hawe, Pepperell, both of Mass.

[73] Assignee: Digital Equipment Corp., Maynard, Mass.

[21] Appl. No.: 255,309

[22] Filed: Jun. 7, 1994

Related U.S. Application Data

[63] Continuation of Ser. No. 645,935, Jan. 25, 1991, abandoned.

[51] Int. Cl.$^6$ .................................... H04L 12/46
[52] U.S. Cl. ............................ 370/85.13; 370/99
[58] Field of Search ............... 370/85.13, 85.14, 79, 370/99

[56] References Cited

U.S. PATENT DOCUMENTS

| | | | |
|---|---|---|---|
| 4,587,651 | 5/1986 | Nelson et al. | 370/88 |
| 4,627,052 | 12/1986 | Hoare et al. | 370/88 |
| 4,706,081 | 11/1987 | Hart et al. | 340/825.03 |
| 4,737,953 | 4/1988 | Koch et al. | 370/94 |
| 4,811,337 | 3/1989 | Hart | 370/85 |
| 4,823,122 | 4/1989 | Mann et al. | 340/825.28 |
| 4,831,620 | 5/1989 | Conway et al. | 370/85 |
| 4,893,307 | 1/1990 | McKay et al. | 370/94.1 |
| 4,897,841 | 1/1990 | Gang, Jr. | 370/85.13 |
| 4,901,312 | 2/1990 | Hui et al. | 370/85.12 |
| 4,922,503 | 5/1990 | Leone | 370/85.13 |
| 4,933,938 | 6/1990 | Sheehy | 370/85.13 |
| 4,947,390 | 8/1990 | Sheehy | 370/85.13 |
| 5,027,350 | 6/1991 | Marshall | 370/85.13 |
| 5,031,174 | 7/1991 | Natsume | 370/85.14 |

FOREIGN PATENT DOCUMENTS

| | | |
|---|---|---|
| 0228078 | 7/1987 | European Pat. Off. . |
| 0255767 | 2/1988 | European Pat. Off. . |
| 0321203A2 | 6/1989 | European Pat. Off. ..... H04L 11/18 |

OTHER PUBLICATIONS

Bostonicc/89, vol. 1, Jun. 1989, Boston, Massachusetts, K. Jakobs, pp. 346-350, "OSI—An Appropriate Basis for Group Communication".

"Transparent Interconnection of Incompatible Local Area Networks Using Bridges", by George Varghese and Radia Perlman, Computer Communication Review, vol. 17, N. 5, Aug. 1987, New York, New York, pp. 381-389 see paragraph 4.

"OSI Addressing Strategies for Interconnecting LANS", by Gee-Swee Poo and Wilson Ang, Computer Communications, vol. 13, No. 5, May 1990, London, Great Britain see the whole document.

"Bridge for Interconnecting Local Area Networks Haiving Different Architectures," IBM Technical Disclosure Bulletin, vol. 33, No. 7, Dec. 1990, new York, New York, USA.

"Gateway Design for Internetwork Multicast Communication," by L. Hughes, Computer Communications, vol. 12, No. 3, Jun. 1989, London, Great Britain, pp. 123-130.

"ISDN, DECnet, and SNA Communications," edited by Thomas C. Bartee, Chapter 9 by Radia Perlman, published by Howard W. Sams & Company, Indianapolis, Indiana, 1989. This runs from pp. 335-366. With this PTO-1449, we are only sending the title page, reference page, and first and last pages. The complete article was submitted with an Amendment on Apr. 27, 1992.

*Primary Examiner*—Douglas W. Olms
*Assistant Examiner*—Min Jung
*Attorney, Agent, or Firm*—Krishnendu Gupta; Ronald C. Hudgens; Arthur W. Fisher

[57] ABSTRACT

A frame having a desired destination address written into the destination address field of the frame is transmitted onto a first communications system, the frame is received by the apparatus, the frame is transmitted by the apparatus onto a second communications system with a second destination address written into the destination address field of the second frame, and also the desired destination address is written into a predetermined field of the second frame along with an indicator. The indicator is capable if being interpreted by a receiving station to mean that the desired destination address is written into the predetermined field of the second frame.

9 Claims, 5 Drawing Sheets

LOOK-UP TABLE
260

| INDICATOR | MULTICAST ADDRESS |
|---|---|
| 262 | 264 |
| ... | ... |
| 266 | 268 |

FIG. 8

TABLE
270

| FRAME TYPE | ASSOCIATED MULTICAST ADDRESS |
|---|---|
| 272 | 274 |
| ... | ... |
| 276 | 278 |

ENCAPSULATION OF AN ADDRESS WITHIN A FORWARDED FRAME IN A COMPUTER COMMUNICATIONS SYSTEM

This application is a continuation of application Ser. No. 07/645,935, filed Jan. 25, 1991, now abandoned.

FIELD OF THE INVENTION

The invention relates generally to addressing of frames between local area networks, and more particularly to encapsulation of an address within a frame forwarded from a first local area network to a second local area network.

TABLE OF RELATED PATENTS

The following Applications for United States Patent are related to the present application, are assigned to the same assignee as the present application and are filed on even date with the present application:

Title: "Many to Few Group Address Translation Through a Network Bridge", filed by F. J. Backes, et al., Ser. No. 07/645,934.

Title: "Using a Multicast Address in a Local Area Network where the Local Area Network has Inadequate Multicast Addressing Capability"", filed by R. J. Perlman, Ser. No. 07/645,933;

and all disclosures of these related patent applications are incorporated herein by reference.

BACKGROUND OF THE INVENTION

Local area networks, LANs, have been designed with many different addressing schemes. For example, the Ethernet LAN design, IEEE 802.3 standard, has 47 bits designated for multicast addresses for a total of approximately 140 trillion addresses.

In contrast, implementations of the token ring IEEE 802.5 standard provide only approximately 24 to approximately 31 separate addresses for multicast addresses, and these addresses are provided in the functional addressing defined by the IEEE 802.5 standard. The IEEE 802.5 standard provides 6 bytes, or 48 bits, for functional addressing, but chips implementing the standard first require a few of the bits to be set to a defined value, referred to as the Functional Address Indicator, and also require that only one bit of the remaining bits be set to "1", and the others be set to The bits having the defined value give an indication that the rest of the bits indicate a "functional address", and the "rest of the bits" is only approximately 24 to 31 bits depending upon the implementation, and only one of these bits can be set.

It is common practice to forward frames from one LAN to another LAN by means of a bridge. Normally, the destination address field of a frame arriving at the bridge from a first LAN is copied into the destination address field of the frame transmitted by the bridge onto the second LAN. However, in the case of multicast addresses, in the event that the first LAN is an Ethernet supporting 140 trillion multicast addresses it is not possible to directly map to a token ring IEEE 802.5 address space of only approximately 24 to 31 addresses available for multicast purposes.

A solution to the mapping of multicast addresses between LANs of different size multicast address spaces has been suggested in U.S. Pat. No. 4,933,938, issued to D. B. Sheehy on Jun. 12, 1990. In the Sheehy patent a translation table is used to directly map the multicast addresses of the first LAN onto the multicast addresses of the second LAN.

However, there still remains the problem of some LANs such as Ethernet having approximately 140 trillion multicast addresses and other LANs such as the token ring IEEE 802.5 standard LAN having only approximately 24 to 31 multicast addresses in their functional address space. In bridging an Ethernet LAN to a token ring 802.5 LAN, much of the advantage of having many multicast addresses in Ethernet will be lost in the forwarding of frames to the token ring IEEE 802.5 standard LAN.

SUMMARY OF THE INVENTION

The invention provides a means to preserve the multicast address of a frame on a first communications system having a large multicast address space when the frame is forwarded onto a second communications system having a small multicast address space.

A connection apparatus is provided for connecting a first communications system with a second communications system. There is a means for receiving at least one first frame from said first communications system, said at least one first frame having a destination address field, said destination address field containing a desired destination address, and there is a means for forwarding said at least one first frame onto said second communications system as a second frame, and for writing a second destination address into a destination address field of said second frame. Also there is a means for writing said desired destination address into a predetermined field of said second frame, and a means for writing an indicator into said second frame, said indicator capable of being interpreted by a receiving station to mean that said desired destination address is written into said predetermined field of said second frame.

The frame may be forwarded onto a third communications system supporting the multicast address structure of the first communications system, and the multicast address is recovered from the representation of the multicast address written into the second frame and the multicast address is written into the address field of a third frame transmitted onto the third communications system.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views:

FIG. 8 is a look-up table in accordance with an embodiment of the invention.

FIG. 9 is a look-up table in accordance with an embodiment of the invention.

DETAILED DESCRIPTION

Figure 1:
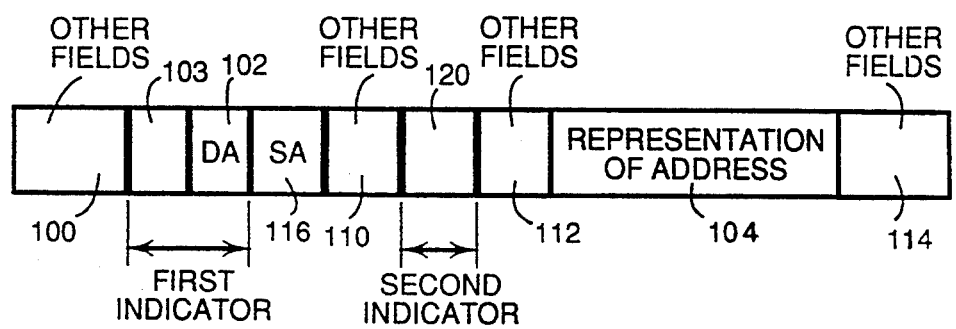
FIG. 1 is a frame field diagram in accordance with the invention.

There is shown in FIG. 1 a field diagram of a frame having a self describing feature in accordance with the invention. The frame is transmitted onto an original LAN by an originating station and is received by one or more stations on either the same LAN or on other LANs connected to the original LAN.

Fields 100 are leading fields, and may, for example, depend upon the particular standard to which the LAN design complies. Field 102 is the destination address, referred to hereinafter as the DA field. Field 102, may in some embodiments of the invention, also comprise an indicator to information which must be interpreted in order for a station detecting the frame to know the intended destination address.

In an example, the frame was forwarded from a first LAN by a bridge to a second LAN, and the DA field in the first LAN contains a multicast address and the second LAN has a small multicast address capability so that there is no direct translation of the original multicast address into an address on the second LAN. In this example, the DA field 102 of the frame on the second LAN is an indicator to additional information stored in the frame on the second LAN, where the additional information enables the receiving station to recover the original multicast address. The additional information is contained in the frame in field 104. In another embodiment of the invention, field 120 is an additional indicator to field 104.

In another embodiment of the invention the first indicator may involve field 103. For example, field 103 may be the frame control field, FC field.

Additionally, FIG. 1 shows other fields 110, 112, 114 which are part of the frame but are not directly involved with the present invention. Also the source address field, SA field, 116 is shown, although the SA field is also not directly involved with the present invention.

As shown in FIG. 1, the invention involves at least one, and alternatively several, indicators 102, 103, 120 to a field 104 holding information needed to recover the original multicast address. Any indicators utilized by the invention as well as the additional information held in field 104 may be referred to as a self describing feature of the frame for recovery of the original multicast address.

Figure 2:
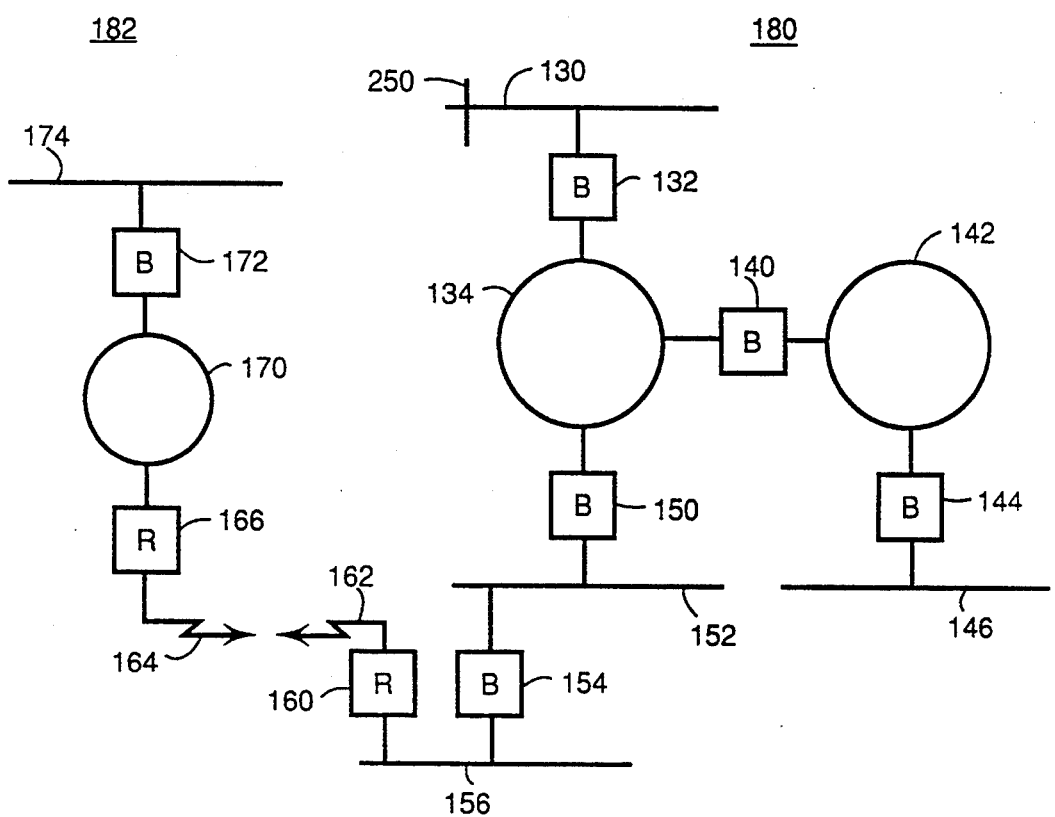
FIG. 2 is a block diagram of multiple LANs connected by bridges and routers in accordance with the invention.

Turning now to FIG. 2, there is shown a representative system made of several local area networks, LANs. The LANs may be connected together by means of bridges to form an extended LAN, or by means of routers to form a wide area network.

Figure 10:
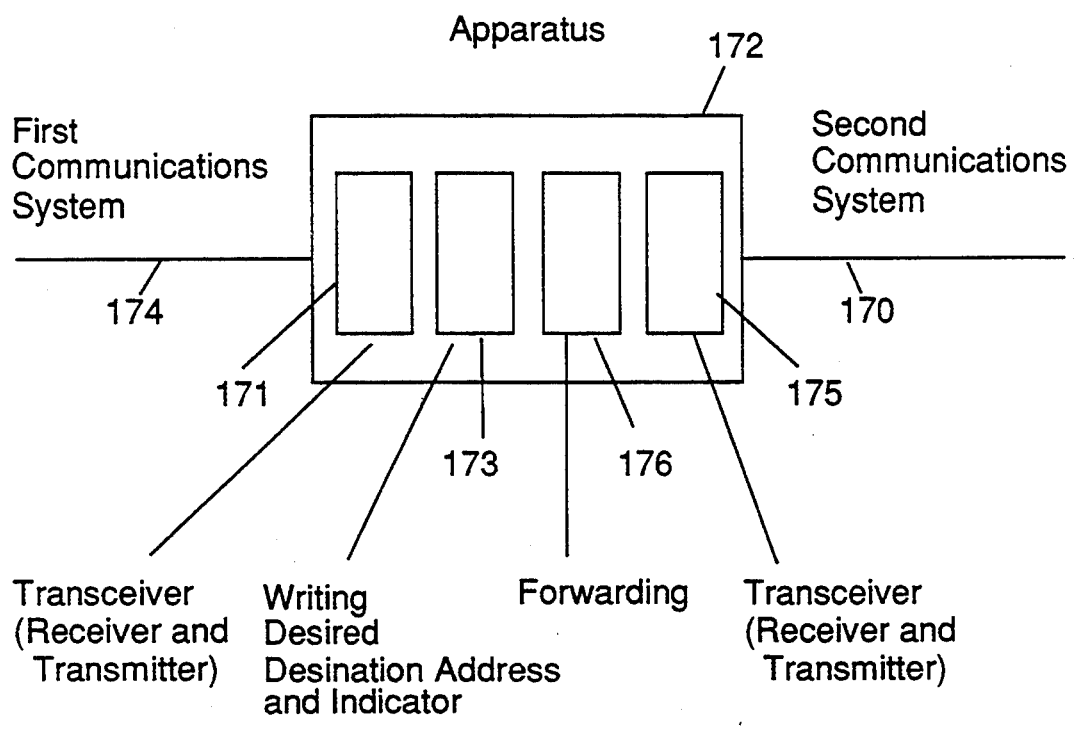
FIG. 10 is a block diagram of a connection apparatus.

Turning now to FIG. 10, an examplary embodiment of the invention is shown. The invention is a connection apparatus 172 for connecting a first communications system 174 with a second communications system 170. There is a means for receiving 171 at least one first frame from the first communications system 174, the at least one first frame having a destination address field, the destination address field containing a desired destination address, and there is a means for forwarding the at least one first frame onto the second communications system 170 as a second frame, and for writing 173 a second destination address into a destination address field of the second frame. Also there is a means for writing the desired destination address into a predetermined field of said second frame, and a means for writing an indicator into the second frame, the indicator capable of being interpreted by a receiving station to mean that said desired destination address is written into said predetermined field of the second frame.

LAN 130 is connected by bridge 132 to LAN 134. For example, LAN 130 may be an Ethernet LAN and or IEEE 802.3 LAN, while LAN 134 may be a token ring. LAN 134 may, for example, be an IEEE 802.5 token ring. Alternatively, LAN 134 may be an ANSI/IEEE FDDI token ring.

LAN 134 is connected by bridge 140 to LAN 142. LAN 142 is connected by bridge 144 to LAN 146. LAN 134 also is connected by bridge 150 to LAN 152. LAN 152 is connected by bridge 154 to LAN 156. LAN 156 is connected by router 160, over a telecommunications link 162, 164, and through router 166 to LAN 170. LAN 170 is connected by bridge 172 to LAN 174.

An extended LAN 180 is formed by the bridge connection of LANs 130, 134, 142, 146, 152, 156. Another extended LAN 182 is formed by bridge connected LANs 170, 174. A wide area network is formed by the router 160, 166 connection of extended LAN 180 to extended LAN 182.

The total system shown in FIG. 2 is simply representative of the complex networks which may be joined together in modern computer communications systems.

Transmission of frames between different LANs is facilitated by standards. For example, the IEEE 802.5 series of standards defines a number of standard LANs. The IEEE 802.2 standard defines a Logical Link Control layer which is common to the various IEEE 802.5 LANs, and is also common to the ANSI/IEEE FDDI token ring.

Figure 3:
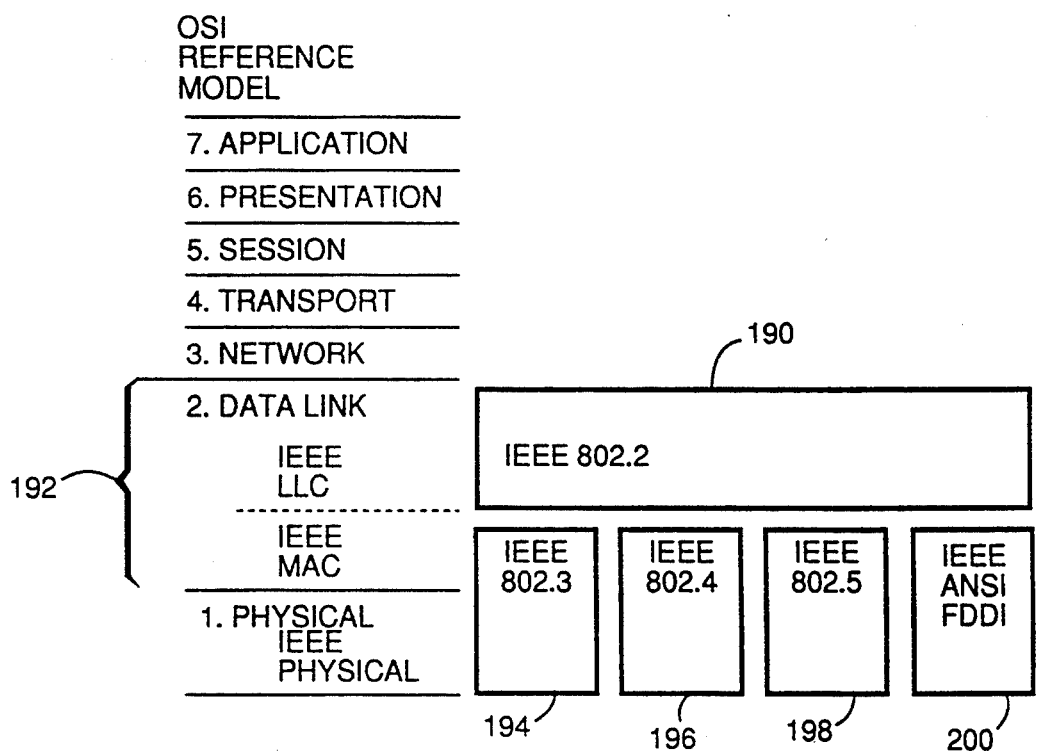
FIG. 3 is a block drawing comparing the OSI Standard Reference Model with IEEE and IEEE/ANSI LAN standards.

Turning now to FIG. 3, there is shown a comparison between the International Standards Organization ISO seven layer Reference Model for communications and the model layers defined by various IEEE and ANSI standard LANs. The IEEE 802.2 LLC, Logical Link Control, block 190 is part of the OSI level 2 Data Link block 192. Also included in the OSI Data Link block 192 is the Medium Access Control, MAC, portion of the IEEE 802.x standards, including the IEEE 802.3 Ethernet block 194, the IEEE 802.4 Token Passing Bus block 196, the IEEE 802.5 Token Ring block 198, and the IEEE/ANSI FDDI block 200. The commonalty of the IEEE 802.2 LLC standard for the specific LAN standards, blocks 194, 196, 198, and 200 is advantageously used by the present invention.

Figure 4:
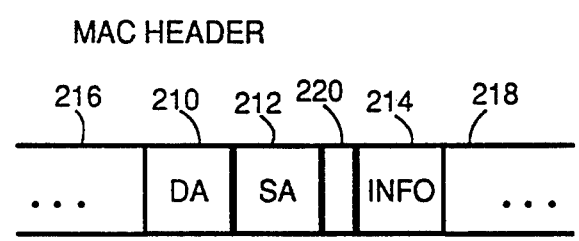
FIG. 4 is a standard frame field diagram for a MAC header.

FIG. 4 shows a representative MAC header frame format of the type used to transmit information on a LAN, and to transmit frames between LANs. Only the destination address DA field 210, the source address field SA 212, and the information INFO 214 fields are shown. Each IEEE 802.x standard defines leading fields 216 and also defines trailing fields 218, and each standard may, for example have its own unique leading 216 and trailing 218 fields. Also, the IEEE 802.3 Ethernet frame has an additional Length field 220 between the SA field 212 and the INFO field 214. The INFO field 214 is used to transmit information from a sending station to a receiving station.

Figure 5:
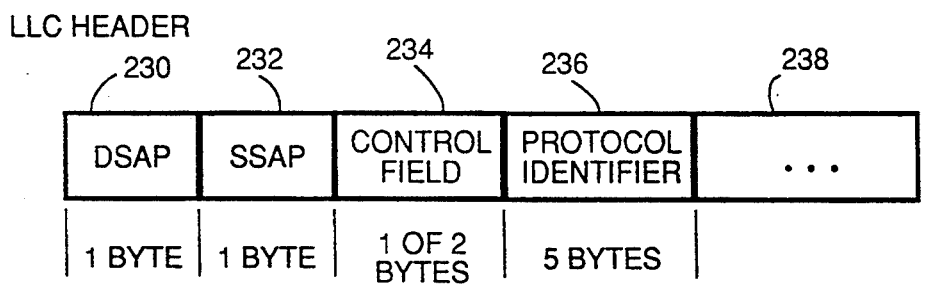
FIG. 5 is a standard frame field diagram for a LLC header.

Turning now to FIG. 5, there is shown an IEEE 802.2 LLC field structure. The field structure shown in FIG. 5 is common to the LAN standards shown in FIG. 3, the IEEE 802.3 Ethernet 194, IEEE 802.4 Token Passing Bus 196, the IEEE 802.5 Token Ring 198, and the IEEE/ANSI FDDI token ring 200. The DSAP field 230 is the Destination Service Access Point field, The SSAP field 232 field is the Source Service Access Point field, the Control Field 234 follows the SSAP 232 field, and an optional Protocol Identifier field 236 may follow the Control Field 234. The condition for having a Protocol Identifier field is that the DSAP field have a value of SNAP SAP. The SNAP SAP value is the Sub Network Access Protocol value, and is a unique value defined in connection with the IEEE 802.2 LLC standard. For example, the SNAP SAP is a special SAP value assigned for the purpose of encapsulating a protocol type field in the LLC header, for example Protocol Identifier field 236. For example, the SNAP SAP value may be alternating 1's and 0's in the DSAP byte, field 230. In some exemplary embodiments it is also convenient for the SSAP field 232 to have the SNAP SAP value.

Fields 238 trail the Protocol Identifier field 236 when it is present, or trail the Control Field 234 when the Protocol Field 236 is absent. Fields 238 carry information for use by the LLC layer, or for transmission to higher layers in the OSI Reference model.

Figure 6A:
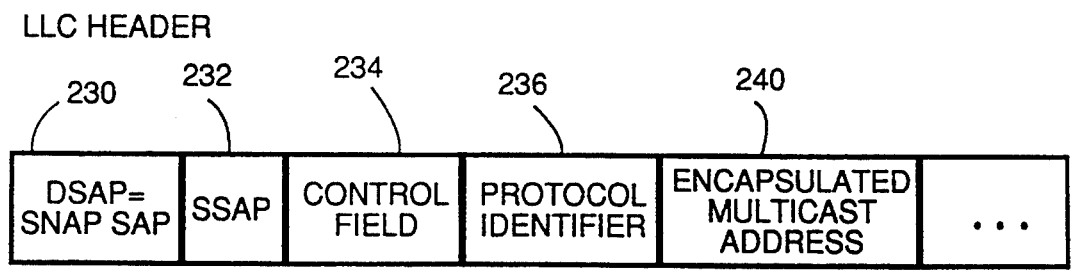
FIG. 6A is a LLC header in accordance with an embodiment of the invention.

A first embodiment of the invention using encapsulation of the desired multicast address is shown in FIG. 6. Referring to FIG. 4, a destination address DA field 210 in the MAC header is chosen to indicate that a multicast address must be recovered from information held within the frame. For example, in the event that the frame is being forwarded onto an IEEE 802.5 token ring LAN the DA field 210 is chosen as one of the functional addresses, and this functional address is reserved to always indicate that a multicast address must be recovered from information stored within the frame. The multicast address may then be located either before the LLC header or after the LLC header.

In a second embodiment of the invention, the DA field 210 of the MAC header is chosen as the same functional address of the First Embodiment, however, referring once again to FIG. 6, the DSAP field 230 is chosen to equal the SNAP SAP value. The multicast address is then stored within field 240 immediately following the Protocol Identifier field 236.

Figure 7:
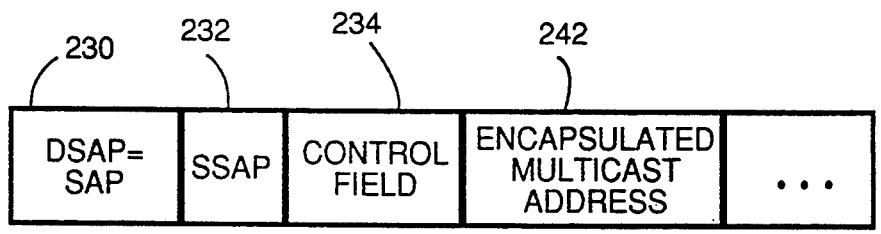
FIG. 7 is a LLC header in accordance with an embodiment of the invention.

In a third embodiment of the invention, the DA field 210 of the MAC header is chosen as the same functional address of the First Embodiment, but the DSAP value is chosen as a different SAP value. The Protocol Identifier field 236 is then absent, and the desired multicast address is stored in a field 242 immediately following the control field 234, as shown in FIG. 7.

In a fourth embodiment of the invention, a table look-up method is used to recover the desired multicast address in a local area network (LAN), where the LAN has inadequate multicast address ability. FIG. 8 illustrates the look-up table 260. The DA field 210 of the MAC header is chosen, as hereinabove, to contain a functional address. However, a specific value of a SAP is associated with each commonly used multicast address. The appropriate value of SAP is then placed in the DSAP field 230 of the LLC header. A station detecting this frame interprets the frame by first, recognizing from the address in the DA field 210 of the MAC header that information concerning a multicast address is contained within the frame; second, recognizing that the SAP value contained within the DSAP field 230 is an indicator 262 serving as an entry point to table 260 containing the multicast address as an entry 264; and third, using the SAP value read from the DSAP field 230 to enter the table and look up the desired multicast address, where the SAP value 266 corresponds to the multicast address 268. A list of SAP values are dedicated to the table 260, and each of the dedicated SAP values is an entry point into the table stored in the station. A table value corresponds to each entry point, and the table value contains the desired multicast address. The table must be created within the station. The table may, as a first example, be created by the station manufacturer when the station is manufactured. The table may, as a second example, be created by a systems manager by entering the appropriate corresponding SAP and multicast addresses. The table may, as a third example, be created remotely by information messages arriving over the LAN and received by the station.

In a fifth embodiment of the invention, a table look-up method similar to the method of the fourth embodiment is used. The table 260 is illustrated in FIG. 8. However, the DA field of the MAC header contains a broadcast address. For example, the broadcast address may be that all six bytes of an exemplary DA field are set to equal "1", to make 48 "1"s. Again, a dedicated SAP value is written into the DSAP field of the LLC header, and the dedicated SAP value is an entry 262, 266 into table 260 holding the desired multicast address 264, 268.

In a sixth embodiment of the invention, a table look-up method similar to the method of the fourth embodiment is used. However, the DSAP field of the LLC header is set equal to the SNAP SAP value, and the Protocol Identifier field 236 of FIG. 6 of the LLC header contains the entry to the table 260. The desired multicast address is stored as a value in the table at a location 268 corresponding to the identifier 266. Protocol Identifier field 236 is defined in the IEEE 802.5 standard as being 5 bytes long, where each byte is eight bits, for a total of 40 bits in the Protocol Identifier field. With a total of 40 bits, the Protocol Identifier field 236 may hold 2 to the 40'th power, or approximately 1.1 trillion different values, and so the space of this field is sufficiently large enough serve as an entry into a table, where the entry points to a multicast address stored in the table.

In a seventh embodiment of the invention, a frame control field 103 in FIG. 1 from the MAC header is used to indicate that the frame must be parsed and analyzed in order to determine the desired multicast address. This mechanism works in any LAN having a frame control field before the destination address DA field such as the IEEE 802.5 token ring or the ANSI/IEEE FDDI token ring. This embodiment has the disadvantage that the FC field has only one byte, that is eight bits, and it is not possible to have a central authority such as the International Standards Organization or the IEEE assign a unique value for indicating a self describing frame structure for holding a desired multicast address. Accordingly, if another person, or vendor, uses the same value of the FC field for a different purpose, then an interoperability problem will arise.

In an eighth embodiment of the invention, an unused bit, or an unused byte value, in the LLC Control field 234 of FIG. 5 is assigned to the purpose of indicating that the frame contains a multicast address. This embodiment is similar to the use of the Frame Control field from the MAC header, but this embodiment uses the LLC header. This LLC Control field 234 of the LLC header may be one or two bytes long. It is possible to have a value from the LLC Control field assigned, by a standards body such as the International Standards Organization, to a manufacturer for a particular purpose. For example, a particular value could be assigned for the purpose of this invention, to indicate that a multicast address is stored within the frame.

Figure 6B:
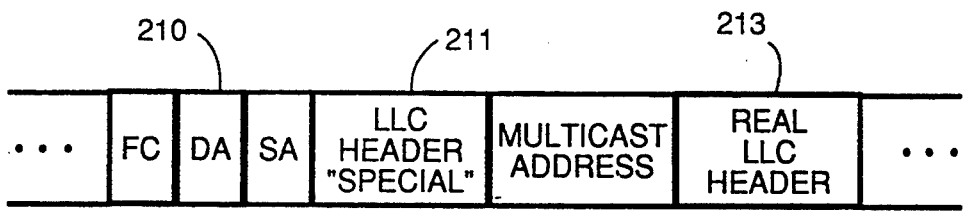
FIG. 6B is a MAC header and a LLC header in accordance with an embodiment of the invention.

In a ninth embodiment of the invention two items in the frame are used to indicate that the frame contains a multicast address, and is shown in FIG. 6B. This embodiment is similar, but a further exemplary embodiment, to the fourth through eighth embodiments hereinabove. The first item is that the destination address, DA field, 102 of FIG. 1, 210 of FIG. 4 of the MAC header contains a special address. The special address may be, for example, a broadcast address, or may be, as a second example, a dedicated functional address. The second item is that a special indicator 120 of FIG. 1 such as, for example, the DSAP field of the LLC header 211, or, as a second example, the SSAP field of the LLC header 211, or for a third example, the frame control field of the LLC header 211, indicates that a multicast address is stored in the frame. This LLC header 211 is a special LLC header devoted to addressing. Additionally, a "real" LLC header 213 must also be stored in the frame to contain the usual LLC header values, protocol code points, etc., rather than addressing information.

In a tenth embodiment of the invention, the DA field 210 of the MAC header along with the SAP value in the DSAP field 230 informs the station that the frame must be further parsed in order to determine the type of frame. Once the type of frame is determined, then a table 270 in FIG. 9 associating frame type and multicast addresses is entered at frame type entry 272. The table provides an output giving the desired multicast address 274. For example, the frame may be a service advertising message as disclosed in U.S. Pat. No. 4,823,122 issued to Mann et al. on Apr. 18, 1989, and entitled "Local Area Network for Digital Data Processing System". Once the station determines that the frame is a service advertising message, the station looks up this frame type 276 in the table and the associated multicast address 278 used by this type of frame. The table contains a list of multicast address 274, 278 for each type of frame 272, 276 recognized by the station.

In an eleventh embodiment of the invention the "type of frame" method as in the tenth embodiment is used, however, there is used any of the other methods of indicating that a multicast address is stored within the frame.

An advantage of using a chosen value of a SAP in the DSAP field 230 is that the International Standards Organization assigns values of SAPs for particular uses. Accordingly, a user, or a vendor, can have a unique value, or set of values, assigned to indicate a self describing frame holding a desired multicast address. No interoperability issue will arise with another vendor because the International Standards Organization will assign different values to other vendors for other purposes. Also, this advantage follows from using any other field for which a standards body will assign a particular value to a manufacturer, for example the LLC header Control field.

Use of the invention may be described with reference to FIG. 2. As an example, assume that a frame originates from station 250 on LAN 130, assume further that LAN 130 is an IEEE 802.3 ethernet with 140 trillion available multicast addresses. The frame is forwarded to LAN 134, and assume further that LAN 134 is an IEEE 802.5 token ring with only approximately 31 functional addresses which can be used for multicast addresses. Bridge 132 then utilizes one of the embodiments of the invention mentioned hereinabove in order to make the frame on LAN 134 self describing for the purpose of the desired multicast address.

Bridge 150 will forward the frame from LAN 134 to LAN 152. Assume that LAN 152 is an IEEE 802.3 Ethernet LAN. Bridge 150 will analyze the self describing frame in order to learn the desired multicast address, and will write the desired multicast address into the DA field 102 of the MAC header before transmitting the frame onto LAN 152.

Bridge 140 will forward the frame onto LAN 142. Assume that LAN 142 is an ANSI/IEEE FDDI LAN. Bridge 140 will analyze the self describing frame in order to learn the desired multicast address, and will write the desired multicast address into the DA field of the MAC header before transmitting the frame onto FDDI LAN 142. The FDDI standard may define multicast addresses differently from the IEEE 802.3 Ethernet standard of LAN 130, and bridge 140 will properly account for any such difference in writing a multicast address into DA field 102.

Bridge 154 will forward the frame onto LAN 156, and in the event that LAN 156 is an IEEE 802.5 Ethernet, then the multicast address in DA field 102 will not require modification by bridge 154.

Repeater 162 and repeater 166 will forward the frame to LAN 170, and in the event that LAN 170 is again an IEEE 802.5 token ring, the invention will once again be employed, this time by repeater 166, in order to make the frame on LAN 170 self describing.

Bridge 172 will forward the frame to LAN 174. Assume that LAN 174 is an IEEE 802.3 Ethernet. Bridge 172 will use the self describing feature of the frame on LAN 170, in accordance with the invention, in order to recover the desired multicast address and write the desired multicast address into the DA field 102 of the MAC header before transmitting the frame onto LAN 174. The multicast address, in this example, started from an IEEE 802.3 Ethernet LAN 130, passed through two IEEE 802.5 LANs, LAN 134 and LAN 170, and was recovered as the multicast address used on IEEE 802.3 Ethernet LAN 174.

It is to be understood that the above-described embodiments are simply illustrative of the of the principles of the invention. Various other modifications and changes may be made by those skilled in the art which will embody the principles of the invention and fall within the spirit and scope thereof.

What is claimed is:

1. A connection apparatus for connecting a first communications system with a second communications system, comprising:

means for receiving at least one first frame from said first communications system, said at least one first frame having a destination address field, said destination address field containing a desired destination address;

means for determining, in response to said desired destination address, whether or not an encapsulation of said at least one first frame is needed for forwarding onto said second communications system, and in the event that encapsulation is determined to be needed selecting an indicator;

means for forwarding said at least one first frame onto said second communications system as a second frame, and for writing a second destination address into a destination address field of said second frame;

means for writing said desired destination address into a predetermined field of said second frame;

means for writing said indicator into said second frame, said indicator capable of being interpreted by a receiving station to mean that said desired destination address is written into said predetermined field of said second frame.

2. The apparatus as in claim 1 wherein said indicator further comprises a predetermined address written into said destination address field of said second frame.

3. The apparatus as in claim 1 wherein said indicator further comprises a predetermined value written into a predetermined field of a LLC header.

4. The apparatus as in claim 1 wherein said indicator further comprises a predetermined address written into said destination address field of said second frame and a predetermined value written into a DSAP field of a LLC header in said second frame.

5. The apparatus as in claim 1 wherein said second communications system is an IEEE 802.5 token ring LAN, and said indicator is a functional address provided by an implementation of said second communications system.

6. The apparatus as in claim 1 wherein indicator further comprises a SNAP SAP value written into a DSAP field in a LLC header of said second frame, and said predetermined field follows a Protocol Identifier field of said second frame.

7. The apparatus as in claim 1 wherein said indicator further comprises a value written into a DSAP field in a LLC header of said second frame, said value being not a SNAP SAP value, and said predetermined field follows a Control Field of said second frame.

8. The apparatus as in claim 1 wherein said predetermined field is six bytes in length.

9. A connection apparatus for connecting a first communications system with a third communications system, comprising:

means for receiving at a first station, said first station connected to both said first communication system and a second communication system, at least one first frame from said first communications system, said at least one first frame having a destination address field, said destination address field containing a desired destination address;

means for determining by said first station, in response to said desired destination address, whether or not an encapsulation of said at least one first frame is needed for forwarding onto said second communications system, and in the event that encapsulation is determined to be needed selecting an indicator;

means for forwarding by said first station said at least one first frame onto said second communications system as a second frame, and for writing a second destination address into a destination address field of said second frame;

means for writing by said first station said desired destination address into a predetermined field of said second frame;

means for writing said indicator into said second frame, said indicator capable of being interpreted by a receiving station on said second communications system to indicate that said desired destination address is written into said predetermined field of said second frame, said receiving station also being connected to said third communication system;

means, in said receiving station on said second communication system, for forwarding said second frame as a third frame onto said third communications system;

means in said receiving station responsive to said indicator, for reading said desired destination address from said predetermined field of said second frame, and for writing said desired destination address into a destination address field of said third frame.

* * * * *